(12) United States Patent
Takagi

(10) Patent No.: US 11,195,416 B2
(45) Date of Patent: Dec. 7, 2021

(54) SYSTEM, MANAGEMENT METHOD, AND INFORMATION PROCESSING DEVICE FOR DETERMINATION OF PARKING POSITION OF VEHICLE

(71) Applicant: HONDA MOTOR CO., LTD., Tokyo (JP)

(72) Inventor: Yuji Takagi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/202,484

(22) Filed: Mar. 16, 2021

(65) Prior Publication Data

US 2021/0201681 A1 Jul. 1, 2021

Related U.S. Application Data

(63) Continuation of application No. PCT/JP2018/035968, filed on Sep. 27, 2018.

(51) Int. Cl.
*G08G 1/123* (2006.01)
*G08G 1/14* (2006.01)
*H04W 4/40* (2018.01)
*G06K 9/00* (2006.01)

(52) U.S. Cl.
CPC ......... *G08G 1/142* (2013.01); *G06K 9/00812* (2013.01); *G08G 1/146* (2013.01); *G08G 1/148* (2013.01); *H04W 4/40* (2018.02)

(58) Field of Classification Search
None
See application file for complete search history.

(56) References Cited

U.S. PATENT DOCUMENTS 8,768,604 B1 * 7/2014 Klimek ............... G08G 1/13
701/117
9,984,576 B2 5/2018 Lin et al.
(Continued)

FOREIGN PATENT DOCUMENTS

JP 2-095990 A 4/1990
JP 2007-272676 A 10/2007
(Continued)

OTHER PUBLICATIONS

International Search Report w/English translation and Written Opinion in Japanese dated Jan. 8, 2019, issued in counterpart International Application No. PCT/JP2018/035968 (9 pages).

*Primary Examiner* — John F Mortell
(74) *Attorney, Agent, or Firm* — Westerman, Hattori, Daniels & Adrian, LLP

(57) ABSTRACT

There is provided a system for managing sharing of a straddle type vehicle, including a position locating unit provided on the straddle type vehicle and configured to locate a position of the straddle type vehicle, a position acquisition unit configured to acquire a position of a peripheral vehicle from the peripheral vehicle present around the straddle type vehicle, and a determination unit configured to determine a parking position at which the straddle type vehicle is parked based on the position of the straddle type vehicle located by the position locating unit and the position of the peripheral vehicle acquired by the position acquisition unit when the straddle type vehicle is parked.

17 Claims, 4 Drawing Sheets

(56) References Cited

U.S. PATENT DOCUMENTS

| | | | |
|---|---|---|---|
| 2010/0117863 A1* | 5/2010 | Dutt | G07F 17/244 340/932.2 |
| 2011/0018759 A1* | 1/2011 | Bennett | G01C 21/3688 342/357.4 |
| 2018/0108259 A1* | 4/2018 | Lin | B60R 25/33 |
| 2019/0103024 A1* | 4/2019 | Rosen | G08G 1/149 |

FOREIGN PATENT DOCUMENTS

| | | |
|---|---|---|
| JP | 3161229 U | 7/2010 |
| JP | 2011-070575 A | 4/2011 |
| JP | 2012-160016 A | 8/2012 |
| JP | 2012-215919 A | 11/2012 |
| JP | 3200433 U | 10/2015 |
| JP | 2016-156347 A | 9/2016 |
| JP | 2017-044563 A | 3/2017 |
| JP | 2018-063710 A | 4/2018 |

\* cited by examiner

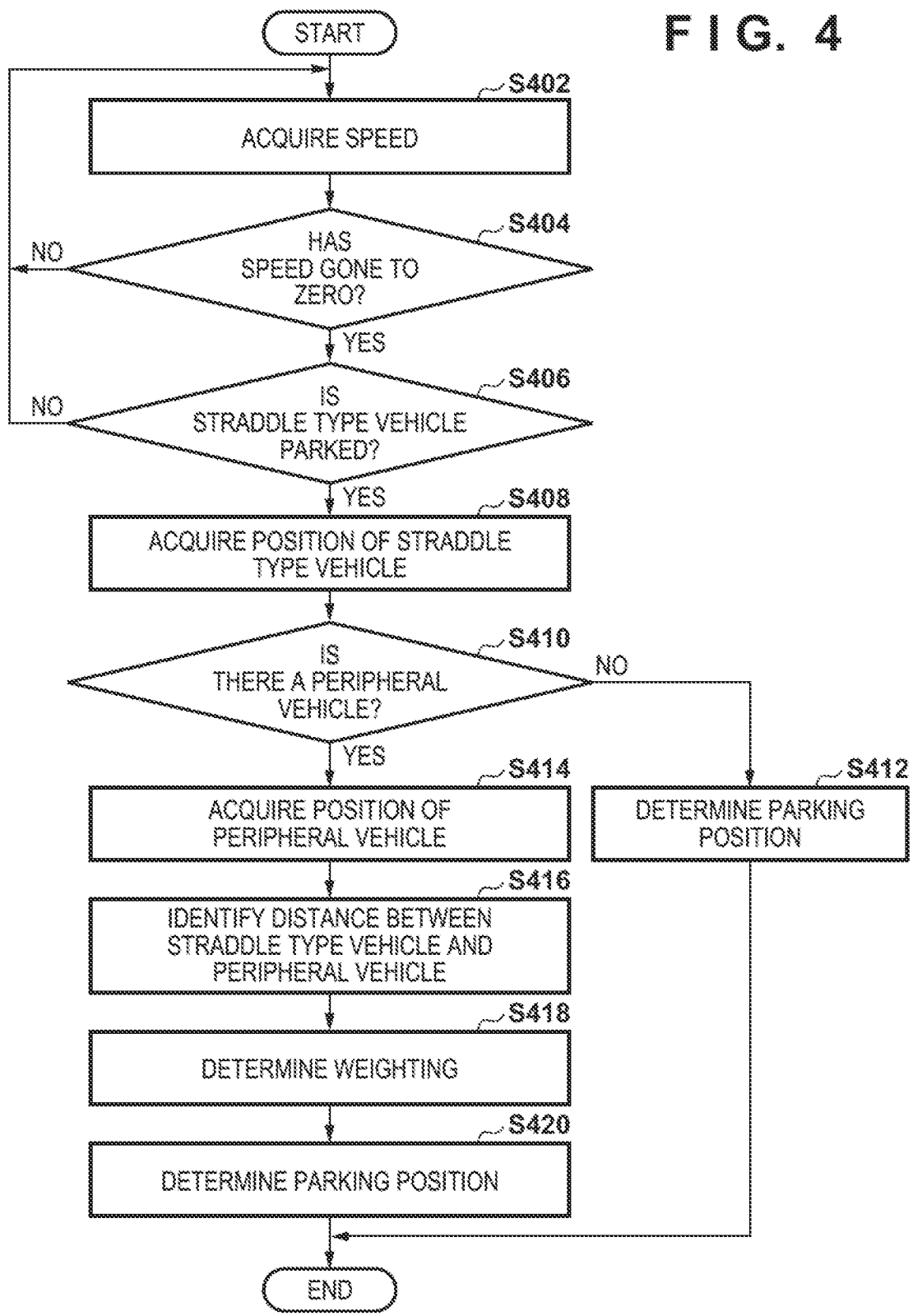

SYSTEM, MANAGEMENT METHOD, AND INFORMATION PROCESSING DEVICE FOR DETERMINATION OF PARKING POSITION OF VEHICLE

CROSS-REFERENCE TO RELATED APPLICATION(S)

This application is a continuation of International Patent Application No. PCT/JP2018/035968 filed on Sep. 27, 2018, the entire disclosures of which are incorporated herein by reference.

TECHNICAL FIELD

The present invention relates to a system, management method, and information processing device for managing sharing of a straddle type vehicle.

BACKGROUND ART

In recent years, car sharing in which automobiles are shared by a plurality of users or companies and used by (shared with) each other has been attracting attention as a new usage form of automobiles represented by four-wheeled vehicles. Such sharing business is projected to expand to two-wheeled vehicles (straddle type vehicles) from now on.

In the sharing business, in order for a manager to manage vehicles (maintenance or the like), it is necessary to locate positions of the vehicles which users have left. Regarding a technique for locating a position of a vehicle, several proposals have been made in the past (see PTL1 and PTL2).

PTL1 discloses a technique for locating a position of a vehicle by using a mobile information terminal. Specifically, in PTL1, when the mobile information terminal capable of communicating with the vehicle receives a latest locating signal, latest located coordinates corresponding to the latest locating signal are set as the last position of the vehicle (parking position), and when the mobile information terminal cannot receive the latest locating signal, the latest located coordinates among a plurality of located coordinates recorded regularly are regarded as the last position of the vehicle.

PTL2 discloses a self-vehicle position recognition device that recognizes the position of a self-vehicle (self-vehicle position). Specifically, in PTL2, the self-vehicle position is determined by GNSS (Global Navigation Satellite System), and the position of a peripheral vehicle (peripheral vehicle position) determined by GNSS is acquired from the peripheral vehicle. A distance between the self-vehicle and the peripheral vehicle is measured by a distance measurement sensor, and based on the peripheral vehicle position and the self-vehicle position recognized when the peripheral vehicle position is acquired, a distance between the positions is calculated. Accuracy of the self-vehicle position is evaluated based on the distance calculated this way.

CITATION LIST

Patent Literature

PTL1: Japanese Patent Laid-Open No. 2018-63710
PTL2: Japanese Patent Laid-Open No. 2017-44563

SUMMARY OF INVENTION

Technical Problem

In the sharing business, however, a technique for more accurately locating the position of the vehicle is desired. Specifically, as the position of a vehicle left by the user, for example, it is not enough only to locate a sharing place (rough position) such as a parking lot, and it is necessary to locate a detailed position in the sharing place. Such a problem becomes prominent in realizing the sharing business of two-wheeled vehicles smaller than four-wheeled vehicles.

Therefore, the present invention provides an advantageous technique for accurately determining the position of a straddle type vehicle.

Solution to Problem

According to the present invention, provided is a system for managing sharing of a straddle type vehicle, the system including: a position locating unit provided on the straddle type vehicle and configured to locate a position of the straddle type vehicle; a position acquisition unit configured to acquire a position of a peripheral vehicle from the peripheral vehicle present around the straddle type vehicle; and a determination unit configured to determine a parking position at which the straddle type vehicle is parked based on the position of the straddle type vehicle located by the position locating unit and the position of the peripheral vehicle acquired by the position acquisition unit when the straddle type vehicle is parked.

According to the present invention, provided is a management method for managing sharing of a straddle type vehicle, the management method including: a first step of locating a position of the straddle type vehicle; a second step of acquiring a position of a peripheral vehicle from the peripheral vehicle present around the straddle type vehicle; and a third step of determining a parking position at which the straddle type vehicle is parked based on the position of the straddle type vehicle located in the first step and the position of the peripheral vehicle acquired in the second step when the straddle type vehicle is parked.

According to the present invention, provided is an information processing device for managing sharing of a straddle type vehicle, the information processing device including: a position locating unit configured to locate a position of the straddle type vehicle; a position acquisition unit configured to acquire a position of a peripheral vehicle from the peripheral vehicle present around the straddle type vehicle; and a determination unit configured to determine a parking position at which the straddle type vehicle is parked based on the position of the straddle type vehicle located by the position locating unit and the position of the peripheral vehicle acquired by the position acquisition unit when the straddle type vehicle is parked.

Advantageous Effects of Invention

According to the present invention, it is possible to provide an advantageous technique for accurately determining the position of the straddle type vehicle.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

FIG. 4 is a flowchart for illustrating a process example of the management system shown in FIG. 1.

DESCRIPTION OF EMBODIMENTS

Hereinafter, a preferred embodiment of the present invention will be described with reference to the attached drawings.

Figure 1:
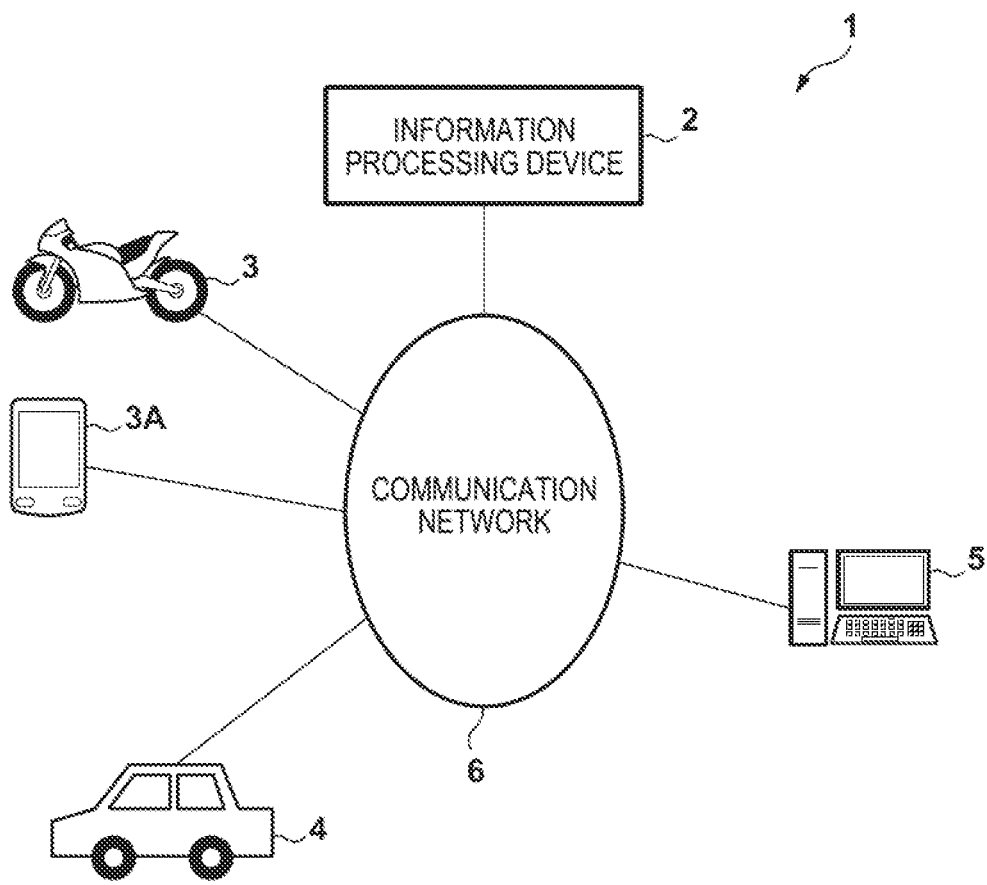
FIG. 1 is a schematic diagram showing a configuration of a management system as one aspect of the present invention.

FIG. 1 is a schematic diagram showing a configuration of a management system 1 as one aspect of the present invention. The management system 1 is a system for managing sharing of a straddle type vehicle, and includes an information processing device 2, a straddle type vehicle 3, an information processing terminal 3A of a driver D (user) of the straddle type vehicle 3, a peripheral vehicle 4, and a terminal 5, as shown in FIG. 1. In the management system 1, the information processing device 2, the straddle type vehicle 3, the information processing terminal 3A, the peripheral vehicle 4, and the terminal 5 are communicatively connected with each other via a communication network 6. FIG. 1 exemplifies a case where one straddle type vehicle 3 (information processing terminal 3A) and one peripheral vehicle 4 constitute a part of the management system 1, but a plurality of straddle type vehicles 3 (information processing terminals 3A) and a plurality of peripheral vehicles 4 may constitute a part of the management system 1.

The information processing device 2 is composed of, for example, a computer including a CPU, a memory, and the like, and functions as a management server in the management system 1.

Figure 2:
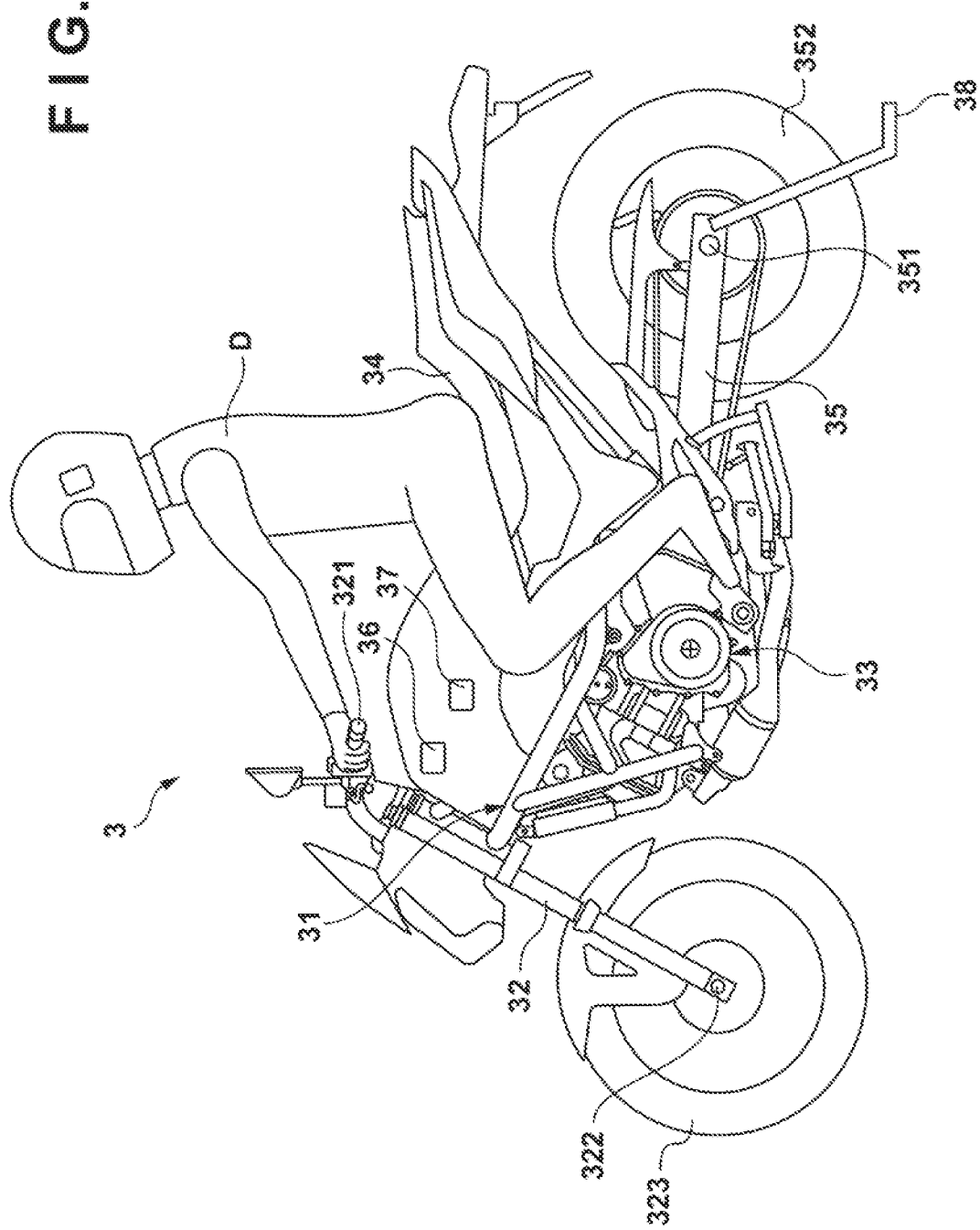
FIG. 2 is a schematic side view showing a straddle type vehicle and a driver.

The straddle type vehicle 3 is a vehicle to be shared provided by a manager, that is, a vehicle rented by the manager of sharing business, and a two-wheeled vehicle on which the driver D rides. As shown in FIG. 2, the straddle type vehicle 3 includes a vehicle body frame 31 which is a skeleton of the vehicle, a front fork 32 supported by the vehicle body frame 31, an engine 33, a seat 34, a swing arm 35, a GPS (Global Positioning System) receiving unit 36, a communication unit 37, and a stand 38. FIG. 2 is a schematic side view showing the straddle type vehicle 3 and the driver D.

The vehicle body frame 31 includes, for example, a head pipe steerably supporting the front fork 32, a main frame extending rearward and obliquely downward from the lower part of the head pipe, a center frame extending downward from the rear end of the main frame, a seat rail extending rearward and upward from the rear end of the main frame, a down frame extending downward and obliquely rearward from the front end of the main frame, and an upper frame extending rearward and downward from the upper part of the head pipe to the main frame.

The front fork 32 supports a bar handle 321 at the upper end and supports a front wheel 323 via an axle 322 at the lower end. The engine 33 includes, for example, a crankcase and a cylinder portion provided so as to tilt forward from the crankcase. A transmission may be integrally provided on the rear of the crankcase. The seat 34 is provided on the seat rail. The swing arm 35 is supported by the center frame so as to be able to swing up and down, and supports a rear wheel 352 via an axle 351 at the rear end.

The GPS receiving unit 36 receives, from each of a plurality of GPS satellites, data (positioning signal) including time information, orbit information of all satellites, and orbit information of the satellite itself, performs calculation on the basis of the data, and thereby acquires the position (three-dimensional position) of a point at which the data is received. Therefore, the GPS receiving unit 36 functions as a locating unit that locates the position of the straddle type vehicle 3 running and the position (parking position) of the straddle type vehicle 3 being parked (stopping).

The communication unit 37 includes a communication interface capable of communicating with the information processing device 2 via the communication network 6. In the embodiment, the communication unit 37 also includes a communication interface capable of communicating with the information processing terminal 3A and the peripheral vehicle 4 by using short-range wireless communication including Wi-Fi® and Bluetooth®, and the like.

The stand 38 is provided to support the straddle type vehicle 3, for example, on the left side of the straddle type vehicle 3 as a side stand. The stand 38 is operated (used) by the user when the straddle type vehicle 3 is parked. Note that the stand 38 is not limited to the side stand and may be provided in the center of the straddle type vehicle 3 as a center stand.

The information processing terminal 3A is a terminal used by the user who shares the straddle type vehicle 3, that is, the driver D of the straddle type vehicle 3, and is, for example, a computer or a mobile terminal including a CPU, a memory, and the like. The information processing terminal 3A includes a display device and a communication device. In the embodiment, information provided to the driver D of the straddle type vehicle 3 is provided (transmitted) to the information processing terminal 3A from the information processing device 2 or the terminal 5 via the communication network 6. The information processing terminal 3A also includes a GPS receiving unit, and can acquire the position of itself (information processing terminal 3A). Therefore, when the straddle type vehicle 3 is not provided with the GPS receiving unit 36, the GPS receiving unit provided in the information processing terminal 3A functions as a locating unit that locates the position of the straddle type vehicle 3 running and the position (parking position) of the straddle type vehicle 3 when the straddle type vehicle 3 is parked.

The peripheral vehicle 4 is a vehicle that is present around the straddle type vehicle 3, and includes a straddle type vehicle (two-wheeled vehicle), a four-wheeled vehicle, or the like. In the embodiment, the peripheral vehicle 4 means especially a vehicle being parked that is present around the straddle type vehicle 3 when the straddle type vehicle 3 is parked. Here, "around the straddle type vehicle 3" means within a circle having a predetermined radius around the straddle type vehicle 3 as a center, specifically, within a range in which short-range wireless communication including Wi-Fi®, Bluetooth®, and the like can be performed by the communication unit 37. In the embodiment, the peripheral vehicle 4 is a vehicle that acquires and stores the position of itself (peripheral vehicle 4) by GPS or the like.

The terminal 5 is a terminal used by a manager who manages the information processing device 2 (management system 1), and is, for example, a computer or a mobile terminal including a CPU, a memory, and the like. The terminal 5 includes a display device and a communication device. Here, the manager is a provider who provides the user with sharing of the straddle type vehicle 3, and a sharing business operator of the straddle type vehicle 3.

Figure 3:
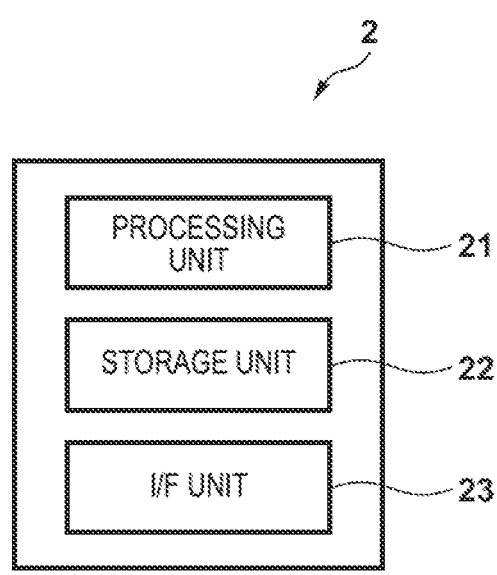
FIG. 3 is a schematic block diagram showing a configuration of an information processing device.

FIG. 3 is a schematic block diagram showing a configuration of the information processing device 2. The information processing device 2 includes a processing unit 21, a storage unit 22, and an interface (I/F) unit 23. The processing unit 21 includes a processor represented by a CPU, and executes a program stored in the storage unit 22. The storage unit 22 includes a storage device such as a RAM, a ROM, or a hard disk. The I/F unit 23 relays transmission and reception of signals between an external device and the processing unit 21. The I/F unit 23 includes a wired or wireless communication interference capable of communicating with the straddle type vehicle 3, the information processing terminal 3A, and the terminal 5 via the communication network 6.

Processing of the management system 1 will be described. Here, processing between the information processing device 2 and the straddle type vehicle 3 will be mainly described. The processing between the information processing device 2 and the straddle type vehicle 3 includes rental processing related to rental of the straddle type vehicle 3 between the manager and the user, and return processing related to return of the straddle type vehicle between the manager and the user.

In the rental processing, first, the user transmits rental request information requesting to rent the straddle type vehicle 3 to the information processing device 2 (manager) via the information processing terminal 3A. The rental request information includes information on, for example, a usage time of the straddle type vehicle 3, a desired vehicle type of the straddle type vehicle 3, and a desired rental location. The information processing device 2 receives the rental request information from the user, and identifies the straddle type vehicle 3 to be rented to the user, that is, to be shared according to the rental request information. Next, the information processing device 2 transmits vehicle notification information notifying the straddle type vehicle 3 to be shared to the user (information processing terminal 3A). The vehicle notification information includes information on, for example, the position (parking position) of the straddle type vehicle 3 to be shared.

The information processing terminal 3A receives the vehicle notification information from the information processing device 2, and provides (displays) the position of the straddle type vehicle 3 to be shared included in the vehicle notification information to the user, for example, via the display device. As a result, the user can confirm the position of the straddle type vehicle 3 to be shared and start renting (riding on) the straddle type vehicle 3 at the position.

On the other hand, in the return processing, the user transmits end request information requesting to end the rental of (return) the straddle type vehicle 3 to the information processing device 2 (manager) via the information processing terminal 3A. The information processing device 2 receives the end request information from the user, confirms whether the straddle type vehicle 3 rented to the user is returned, that is, the straddle type vehicle 3 rented to the user is parked in response to the end request information, and performs a process of determining the parking position of the straddle type vehicle 3.

The process of determining the parking position of the straddle type vehicle 3 will be described with reference to FIG. 4. In S402, the processing unit 21 acquires speed of the straddle type vehicle 3. The speed of the straddle type vehicle 3 is measured by a speed sensor provided on the straddle type vehicle 3, and is transmitted to the information processing device 2 via the communication unit 37 of the straddle type vehicle 3, for example, in response to a request from the information processing device 2.

In S404, the processing unit 21 decides whether the speed of the straddle type vehicle 3 acquired in S402 is zero, that is, whether the speed of the straddle type vehicle 3 has gone to zero. When the speed of the straddle type vehicle 3 has not gone to zero, the process proceeds to S402, and continues acquisition of the speed of the straddle type vehicle 3. On the other hand, when the speed of the straddle type vehicle 3 has gone to zero, the process proceeds to S406.

In S406, the processing unit 21 decides whether the straddle type vehicle 3 is parked. In this way, the processing unit 21 functions as a decision unit that decides whether the straddle type vehicle 3 is parked. In the embodiment, the processing unit 21 decides that the straddle type vehicle 3 is parked when a predetermined time (for example, five minutes) has passed since the speed of the straddle type vehicle 3 gone to zero. However, the decision of whether the straddle type vehicle is parked is not limited to this, and, for example, when the stand 38 provided on the straddle type vehicle 3 is operated after the speed of the straddle type vehicle 3 gone to zero, it may be decided that the straddle type vehicle 3 is parked. In this case, the straddle type vehicle 3 transmits information indicating that the stand 38 is operated to the information processing device 2 via the communication unit 37. In S406, when the straddle type vehicle 3 is not parked, the process proceeds to S402, but when the straddle type vehicle 3 is parked, it proceeds to S408.

In S408, the processing unit 21 acquires the position of the straddle type vehicle 3 when the straddle type vehicle 3 is parked. The position of the straddle type vehicle 3 is located by the GPS receiving unit 36 provided on the straddle type vehicle 3 as described above, and is transmitted to the information processing device 2 via the communication unit 37 of the straddle type vehicle 3, for example, in response to the request from the information processing device 2.

In S410, the processing unit 21 decides whether there is a peripheral vehicle 4 around the straddle type vehicle 3. For example, the processing unit 21 inquires of the straddle type vehicle 3 whether communication can be performed with the peripheral vehicle 4 by using short-range wireless communication of the communication unit 37, and decides that the peripheral vehicle 4 is present around the straddle type vehicle 3 when the straddle type vehicle 3 makes a replay of being able to communicate with the peripheral vehicle 4. However, the processing unit 21 may directly communicate with the peripheral vehicle 4 via the communication network 6, and decide whether the peripheral vehicle 4 is present around the straddle type vehicle 3 based on the position of the straddle type vehicle 3 acquired in S408.

In S410, when there is no peripheral vehicle 4 around the straddle type vehicle 3, the process proceeds to S412. In S412, the processing unit 21 determines the parking position of the straddle type vehicle 3 based on the position of the straddle type vehicle 3 acquired in S408. Specifically, the processing unit 21 determines that the position of the straddle type vehicle 3 acquired in S408 is the parking position of the straddle type vehicle 3.

On the other hand, in S410, when there is a peripheral vehicle 4 around the straddle type vehicle 3, the process proceeds to S414. In S414, the processing unit 21 acquires the position of the peripheral vehicle 4. For example, the processing unit 21 requests the straddle type vehicle 3 to acquire the position of the peripheral vehicle 4 from the peripheral vehicle 4. In response to the request from the processing unit 21, the straddle type vehicle 3 acquires the position of the peripheral vehicle 4 from the peripheral vehicle 4 via the communication unit 37 of the straddle type vehicle 3, and transmits the position of the peripheral vehicle 4 to the information processing device 2. Consequently, the processing unit 21 can acquire the position of the peripheral vehicle 4 from the straddle type vehicle 3. However, the processing unit 21 may directly communicate with the peripheral vehicle 4 via the communication network 6, and acquire the position of the peripheral vehicle 4 from the peripheral vehicle 4. In this way, the communication unit 37 of the straddle type vehicle 3 and the processing unit 21 of the information processing device 2 function as a position acquisition unit that acquires the position of the peripheral vehicle 4 from the peripheral vehicle 4 present around the straddle type vehicle 3.

In S416, the processing unit 21 identifies a distance between the straddle type vehicle 3 and the peripheral vehicle 4. The processing unit 21 obtains an absolute value of difference between the position of the straddle type vehicle 3 acquired in S408 and the position of the peripheral vehicle 4 acquired in S414, and identifies the absolute value as the distance between the straddle type vehicle 3 and the peripheral vehicle 4.

In S418, the processing unit 21 determines weighting to be given to the position of the peripheral vehicle 4 in order to correct the position of the straddle type vehicle 3. The processing unit 21 determines the weighting to be given to the position of the peripheral vehicle 4 acquired in S414 based on the distance between the straddle type vehicle 3 and the peripheral vehicle 4 identified in S416. Such weighting is determined so that the farther (longer) the distance between the straddle type vehicle 3 and the peripheral vehicle 4 is, the less the position of the peripheral vehicle 4 is considered when the position of the straddle type vehicle 3 is corrected, and the nearer (shorter) the distance between the straddle type vehicle 3 and the peripheral vehicle 4 is, the more the position of the peripheral vehicle 4 is considered when the position of the straddle type vehicle 3 is corrected.

In S420, the processing unit 21 determines the parking position of the straddle type vehicle 3 based on the position of the straddle type vehicle 3 acquired in S408, the position of the peripheral vehicle 4 acquired in S414, and the weighting determined in S418. The processing unit 21 determines the parking position of the straddle type vehicle 3 by correcting the position of the straddle type vehicle 3 by using the position of the peripheral vehicle 4 to which the weighting determined in S418 is given. Therefore, when the straddle type vehicle 3 is parked, the processing unit 21 functions as a determination unit that determines the parking position at which the straddle type vehicle 3 is parked based on the position of the straddle type vehicle 3 and the position of the peripheral vehicle 4. Note that the correction of the position of the straddle type vehicle 3 using the weighted position of the peripheral vehicle 4 includes, for example, an average position of the positions. In this way, the parking position of the straddle type vehicle 3 can be more accurately determined by considering the weighted position of the peripheral vehicle 4 rather than the position itself of the straddle type vehicle 3 acquired in S408.

Therefore, according to the management system 1 of the embodiment, it is possible to provide an advantageous technique for accurately determining the parking position of the straddle type vehicle 3 left by the user in the sharing business of the straddle type vehicle 3.

Although in the embodiment, the case where the information processing device 2 (processing unit 21) performs all the steps from S402 to S420 is described as an example, it is also possible to perform some of the steps of S402 to S420 or all the steps of S402 to S420 in the straddle type vehicle 3.

Although in the embodiment, the case where the parking position of the straddle type vehicle 3 is determined by correcting the position of the straddle type vehicle 3 using the weighted position of the peripheral vehicle 4 is described as an example, it is not limited to this. For example, the processing unit 21 may compare position accuracy of the position of the straddle type vehicle 3 acquired in S408 with position accuracy of the position of the peripheral vehicle 4 acquired in S414, and determine the parking position of the straddle type vehicle 3 based on the position having higher position accuracy. Specifically, when the position accuracy of the position of the straddle type vehicle 3 is higher than the position accuracy of the position of the peripheral vehicle 4, the processing unit 21 determines that the parking position of the straddle type vehicle 3 is the position of the straddle type vehicle 3, whereas when the position accuracy of the position of the peripheral vehicle 4 is higher than the position accuracy of the position of the straddle type vehicle 3, it determines that the parking position of the straddle type vehicle 3 is a position obtained by adding the distance between the straddle type vehicle 3 and the peripheral vehicle 4 to the position of the peripheral vehicle 4. Note that the position accuracy of the position of the straddle type vehicle 3 is identified based on intensity of a signal indicating the position of the straddle type vehicle 3, that is, a positioning signal received by the GPS receiving unit 36. Similarly, the position accuracy of the position of the peripheral vehicle 4 is identified based on intensity of a signal indicating the position of the peripheral vehicle 4, that is, a positioning signal received by the GPS receiving unit that locates the position of the peripheral vehicle 4.

The processing unit 21 notifies the parking position of the straddle type vehicle 3 determined in S412 or S420 to the manager of the management system 1. Specifically, the processing unit 21 transmits parking position information indicating the parking position of the straddle type vehicle 3 determined in S412 or S420 to the terminal 5 via the communication network 6. The terminal 5 receives the parking position information and provides (displays) the parking position of the straddle type vehicle 3 indicated by the parking position information to the manager, for example, via the display device. Consequently, the manager can confirm the parking position of the straddle type vehicle 3 left by the user, and go for maintenance or the like of the straddle type vehicle 3.

The processing unit 21 may judge whether the straddle type vehicle 3 at the parking position determined in S412 or S420 is shared. Specifically, the processing unit 21 judges whether the straddle type vehicle 3 can be shared based on a travelable distance of the straddle type vehicle 3 at the parking position determined in S412 or S420 or a time during which the straddle type vehicle 3 at the parking position determined in S412 or S420 is rented to the user.

The processing unit 21 may judge whether the straddle type vehicle 3 can be shared based on failure information predicted for the straddle type vehicle 3 at the parking position determined in S412 or S420. Here, the failure information includes, for example, a dead battery, failure of a lighting system, wear of brake pads, and disconnection of harnesses connected to brakes.

Summary of Embodiment

1. The system (for example, 1) of the embodiment is a system for managing sharing of a straddle type vehicle (for example, 3), the system including:

a position locating unit (for example, 36) provided on the straddle type vehicle and configured to locate a position of the straddle type vehicle;

a position acquisition unit (for example, 37) configured to acquire a position of a peripheral vehicle from the peripheral vehicle present around the straddle type vehicle; and a determination unit (for example, 2 or 21) configured to determine a parking position at which the straddle type vehicle is parked based on the position of the straddle type vehicle located by the position locating unit and the position of the peripheral vehicle acquired by the position acquisition unit when the straddle type vehicle is parked.

According to the embodiment, it is possible to provide an advantageous technique for accurately determining the parking position of the straddle type vehicle left by the user in the sharing business of the straddle type vehicle.

2. The system (for example, 1), wherein the determination means (for example, 2 or 21) determines the parking position by correcting the position of the straddle type vehicle (for example, 3) located by the position locating unit (for example, 36) by using the position of the peripheral vehicle (for example, 4) acquired by the position acquisition unit (for example, 37).

According to the embodiment, it is possible to determine the parking position of the straddle type vehicle by taking the position of the peripheral vehicle into consideration.

3. The system (for example, 1), wherein the determination unit (for example, 2 or 21):

determines weighting given to the position of the peripheral vehicle (for example, 4) acquired by the position acquisition unit (for example, 37) based on a distance between the straddle type vehicle (for example, 3) and the peripheral vehicle; and determines the parking position by correcting the position of the straddle type vehicle (for example, 3) by using the weighted position of the peripheral vehicle.

According to the embodiment, it is possible to determine the parking position of the straddle type vehicle by taking the distance between the straddle type vehicle and the peripheral vehicle into consideration.

4. The system (for example, 1), wherein the determination unit (for example, 2 or 21) compares position accuracy of the position of the straddle type vehicle (for example, 3) located by the position locating unit (for example, 36) with position accuracy of the position of the peripheral vehicle (for example, 4) acquired by the position acquisition unit (for example, 37), and determines the parking position at which the straddle type vehicle is parked based on the position having higher position accuracy.

According to the embodiment, it is possible to determine the parking position of the straddle type vehicle by taking into consideration the position having higher position accuracy between the position of the straddle type vehicle and the position of the peripheral vehicle.

5. The system (for example, 1), wherein the determination unit (for example, 2 or 21):

determines that the parking position is the position of the straddle type vehicle (for example, 3) located by the position locating unit when the position accuracy of the position of the straddle type vehicle located by the position locating unit (for example, 36) is higher than the position accuracy of the position of the peripheral vehicle (for example, 4) acquired by the position acquisition unit (for example, 37); and determines that the parking position is a position obtained by adding a distance between the straddle type vehicle and the peripheral vehicle to the position of the peripheral vehicle acquired by the position acquisition unit when the position accuracy of the position of the peripheral vehicle acquired by the position acquisition unit is higher than the position accuracy of the position of the straddle type vehicle located by the position locating unit.

According to the embodiment, it is possible to determine the parking position of the straddle type vehicle by taking the position accuracy of the straddle type vehicle and the position accuracy of the peripheral vehicle into consideration.

6. The system (for example, 1), wherein the determination unit (for example, 2 or 21):

identifies the position accuracy of the position of the straddle type vehicle (for example, 3) based on intensity of a signal indicating the position of the straddle type vehicle received by the position locating unit (for example, 36); and identifies the position accuracy of the position of the peripheral vehicle (for example, 4) based on intensity of a signal indicating the position of the peripheral vehicle received by a locating unit provided on the peripheral vehicle and configured to locate the position of the peripheral vehicle.

7. The system (for example, 1) further including a decision unit (for example, 2 or 21) configured to decide whether the straddle type vehicle (for example, 3) is parked, and wherein the determination unit (for example, 2 or 21) determines the parking position when the decision unit decides that the straddle type vehicle is parked.

According to the embodiment, it is possible to determine the parking position of the straddle type vehicle when the straddle type vehicle is parked.

8. The system (for example, 1), wherein the decision unit (for example, 2 or 21) decides that the straddle type vehicle (for example, 3) is parked when a predetermined time has passed since speed of the straddle type vehicle gone to zero.

According to the embodiment, it is possible to decide whether the straddle type vehicle is parked based on the speed of the straddle type vehicle.

9. The system (for example, 1), wherein the decision unit (for example, 2 or 21) decides that the straddle type vehicle (for example, 3) is parked when a stand (for example, 38) provided on the straddle type vehicle is operated.

According to the embodiment, it is possible to decide whether the straddle type vehicle is parked based on an operation of the stand of the straddle type vehicle.

10. The system (for example, 1), wherein the position locating unit (for example, 36) includes at least one of a GPS receiving unit (for example, 36) provided on the straddle type vehicle (for example, 3) and a GPS receiving unit provided in an information processing terminal (for example, 3A) possessed by a driver (for example, D) of the straddle type vehicle.

According to the embodiment, it is possible to locate the position of the straddle type vehicle by using GPS.

11. The system (for example, 1), wherein
the position acquisition unit (for example, 37) uses short-range wireless communication to acquire the position of the peripheral vehicle (for example, 4) from the peripheral vehicle.

According to the embodiment, it is possible to acquire the position of the peripheral vehicle from the peripheral vehicle within a range where short-range wireless communication can be communicated.

12. The system (for example, 1), further including
a notification unit (for example, 2 or 21) configured to notify the parking position determined by the determination unit (for example, 2 or 21) to a manager of the system (for example, 1).

According to the embodiment, the manager can confirm the parking position of the straddle type vehicle.

13. The system (for example, 1), further including
a judgment unit (for example, 2 or 21) configured to judge whether the straddle type vehicle (for example, 3) at the parking position determined by the determination unit (for example, 2 or 21) can be shared.

14. The system (for example, 1), wherein
the judgment unit (for example, 2 or 21) judges whether the straddle type vehicle (for example, 3) can be shared based on a travelable distance of the straddle type vehicle at the parking position determined by the determination unit (for example, 2 or 21).

15. The system (for example, 1), wherein
the judgment unit (for example, 2 or 21) judges whether the straddle type vehicle (for example, 3) can be shared based on a time during which the straddle type vehicle at the parking position determined by the determination unit (for example, 2 or 21) is rented to a user.

16. The system (for example, 1), wherein
the judgment unit (for example, 2 or 21) judges whether the straddle type vehicle (for example, 3) can be shared based on failure information predicted for the straddle type vehicle at the parking position determined by the determination unit (for example, 2 or 21).

17. The management method of the embodiment
is a management method for managing sharing of a straddle type vehicle (for example, 3), the management method including:
a first step of locating a position of the straddle type vehicle;
a second step of acquiring a position of a peripheral vehicle (for example, 4) from the peripheral vehicle present around the straddle type vehicle; and
a third step of determining a parking position at which the straddle type vehicle is parked based on the position of the straddle type vehicle located in the first step and the position of the peripheral vehicle acquired in the second step when the straddle type vehicle is parked.

According to the embodiment, it is possible to provide an advantageous technique for accurately determining the parking position of the straddle type vehicle left by the user in the sharing business of the straddle type vehicle.

18. The information processing device (for example, 2) of the embodiment
is an information processing device for managing sharing of a straddle type vehicle (for example, 3), the information processing device including:
a position locating unit (for example, 21) configured to locate a position of the straddle type vehicle;
a position acquisition unit (for example, 21) configured to acquire a position of a peripheral vehicle from the peripheral vehicle present around the straddle type vehicle; and
a determination unit (for example, 21) configured to determine a parking position at which the straddle type vehicle is parked based on the position of the straddle type vehicle located by the position locating unit and the position of the peripheral vehicle acquired by the position acquisition unit when the straddle type vehicle is parked.

According to the embodiment, it is possible to provide an advantageous technique for accurately determining the parking position of the straddle type vehicle left by the user in the sharing business of the straddle type vehicle.

The present invention is not limited to the above embodiments and various changes and modifications can be made within the spirit and scope of the present invention. Therefore, to apprise the public of the scope of the present invention, the following claims are made.

The invention claimed is:

1. A system for managing sharing of a straddle type vehicle, comprising:
a position locating unit provided on the straddle type vehicle and configured to locate a position of the straddle type vehicle;
a position acquisition unit configured to acquire a position of a peripheral vehicle from the peripheral vehicle present around the straddle type vehicle; and
a determination unit configured to determine a parking position at which the straddle type vehicle is parked based on the position of the straddle type vehicle located by the position locating unit and the position of the peripheral vehicle acquired by the position acquisition unit when the straddle type vehicle is parked,
wherein the determination unit determines the parking position by correcting the position of the straddle type vehicle located by the position locating unit by using the position of the peripheral vehicle acquired by the position acquisition unit.

2. The system according to claim 1, wherein
the determination unit:
determines weighting given to the position of the peripheral vehicle acquired by the position acquisition unit based on a distance between the straddle type vehicle and the peripheral vehicle; and
determines the parking position by correcting the position of the straddle type vehicle by using the weighted position of the peripheral vehicle.

3. The system according to claim 1, wherein
the determination unit compares position accuracy of the position of the straddle type vehicle located by the position locating unit with position accuracy of the position of the peripheral vehicle acquired by the position acquisition unit, and determines the parking position at which the straddle type vehicle is parked based on the position having higher position accuracy.

4. The system according to claim 3, wherein
the determination unit:
determines that the parking position is the position of the straddle type vehicle located by the position locating unit when the position accuracy of the position of the straddle type vehicle located by the position locating unit is higher than the position accuracy of the position of the peripheral vehicle acquired by the position acquisition unit; and
determines that the parking position is a position obtained by adding a distance between the straddle type vehicle and the peripheral vehicle to the position of the peripheral vehicle acquired by the position acquisition unit when the position accuracy of the position of the peripheral vehicle acquired by the position acquisition unit is higher than the position accuracy of the position of the straddle type vehicle located by the position locating unit.

5. The system according to claim 3, wherein
the determination unit:
identifies the position accuracy of the position of the straddle type vehicle based on intensity of a signal indicating the position of the straddle type vehicle received by the position locating unit; and
identifies the position accuracy of the position of the peripheral vehicle based on intensity of a signal indicating the position of the peripheral vehicle received by a locating unit provided on the peripheral vehicle and configured to locate the position of the peripheral vehicle.

6. The system according to claim 1, further comprising a decision unit configured to decide whether the straddle type vehicle is parked, wherein
the determination unit determines the parking position when the decision unit decides that the straddle type vehicle is parked.

7. The system according to claim 6, wherein
the decision unit decides that the straddle type vehicle is parked when a predetermined time has passed since speed of the straddle type vehicle gone to zero.

8. The system according to claim 6, wherein
the decision unit decides that the straddle type vehicle is parked when a stand provided on the straddle type vehicle is operated.

9. The system according to claim 1, wherein
the position locating unit includes at least one of a GPS receiving unit provided on the straddle type vehicle and a GPS receiving unit provided in an information processing terminal possessed by a driver of the straddle type vehicle.

10. The system according to claim 1, wherein the position acquisition unit uses short-range wireless communication to acquire the position of the peripheral vehicle from the peripheral vehicle.

11. The system according to claim 1, further comprising a notification unit configured to notify the parking position determined by the determination unit to a manager of the system.

12. The system according to claim 1, further comprising a judgment unit configured to judge whether the straddle type vehicle at the parking position determined by the determination unit can be shared.

13. The system according to claim 12, wherein the judgment unit judges whether the straddle type vehicle can be shared based on a travelable distance of the straddle type vehicle at the parking position determined by the determination unit.

14. The system according to claim 12, wherein the judgment unit judges whether the straddle type vehicle can be shared based on a time during which the straddle type vehicle at the parking position determined by the determination unit is rented to a user.

15. The system according to claim 12, wherein the judgment unit judges whether the straddle type vehicle can be shared based on failure information predicted for the straddle type vehicle at the parking position determined by the determination unit.

16. A management method for managing sharing of a straddle type vehicle, comprising:
a first step of locating a position of the straddle type vehicle;
a second step of acquiring a position of a peripheral vehicle from the peripheral vehicle present around the straddle type vehicle; and
a third step of determining a parking position at which the straddle type vehicle is parked based on the position of the straddle type vehicle located in the first step and the position of the peripheral vehicle acquired in the second step when the straddle type vehicle is parked,
wherein the third step determines the parking position by correcting the position of the straddle type vehicle located in the first step by using the position of the peripheral vehicle acquired in the second step.

17. An information processing device for managing sharing of a straddle type vehicle, comprising:
a position locating unit configured to locate a position of the straddle type vehicle;
a position acquisition unit configured to acquire a position of a peripheral vehicle from the peripheral vehicle present around the straddle type vehicle; and
a determination unit configured to determine a parking position at which the straddle type vehicle is parked based on the position of the straddle type vehicle located by the position locating unit and the position of the peripheral vehicle acquired by the position acquisition unit when the straddle type vehicle is parked,
wherein the determination unit determines the parking position by correcting the position of the straddle type vehicle located by the position locating unit by using the position of the peripheral vehicle acquired by the position acquisition unit.

* * * * *